United States Patent Office 2,832,740
Patented Apr. 29, 1958

2,832,740

LUBRICATING COMPOSITIONS

William David Garden, Glasgow, Scotland, and James Sinclair McFarlane, Weobley, near Hereford, England, assignors to Imperial Chemical Industries Limited, London, England, a corporation of Great Britain No Drawing. Application December 20, 1954
Serial No. 476,558

Claims priority, application Great Britain
January 15, 1954

5 Claims. (Cl. 252—49.9)

The present invention relates to improvements in or relating to lubricating compositions comprising one or more polysiloxanes.

Liquid organo-substituted polysiloxanes and especially liquid hydrocarbon-substituted polysiloxanes are excellent fluids for lubrication under hydrodynamic or fluid film conditions because of their outstanding resistance to heat and oxidation at elevated temperatures, their low viscosity-temperature coefficients and their low pour-points. Such materials, however, when employed to lubricate two rubbing surfaces under "kinetic boundary" conditions, i. e. under conditions where a fluid film cannot be formed, or if formed maintained, due to the heavy loading between the two relatively moving surfaces, do not afford the desired reduction in friction or the necessary protection against "scuffing" or even seizure between these two rubbing surfaces. This feature is particularly pronounced where both rubbing surfaces are of steel.

The object of the present invention is to provide lubricants capable of lubricating the bearing surfaces of relatively moving metallic parts, as for example mild steel on mild steel, even under increased loads, i. e. under "kinetic boundary" conditions.

According to the present invention a lubricant composition comprises at least one liquid polysiloxane of the kind hereinafter specified and a minor proportion of at least one derivative of orthophosphoric acid wherein one hydrogen atom only is replaced by a long chain alkyl aryl group and wherein at least one of the two other hydrogen atoms is replaced by a non-unsaturated organo group containing only carbon and hydrogen and having not more than nine hydrogen atoms.

By the term "liquid polysiloxane" is meant a polysiloxane comprising a chain structure of alternating silicon and oxygen atoms wherein a preponderant number of the remaining valences of the silicon atom are satisfied by a number of one or more of the organo groups, alkyl, aryl, alkaryl, aralkyl and halogenoaryl groups.

It is intended to include by the term "non-unsaturated organo group containing only carbon and hydrogen and having not more than nine hydrogen atoms" methyl, ethyl, propyl and butyl groups as well as phenyl and cresyl groups which are known to be substantially sterically equivalent to a four carbon atom alkyl group.

The polysiloxanes as hereinbefore defined may be prepared by hydrolysis of silanes or mixtures thereof which are substituted both by organic radicals such as alkyl, aryl, alkaryl, aralkyl or halogenoaryl and by hydrolysable groups such as halogeno, alkoxy, aroxy, acyloxy or amino groups, for example dialkyldihalogenosilanes such as dimethyldichlorosilane, followed by complete or partial condensation of the hydrolysis product. The polysiloxanes thus obtained may be treated with small amounts of strong sulphuric acid and a disiloxane, such as hexamethyldisiloxane, to eliminate terminal hydroxyl groups and thus to produce "end-stopped" polysiloxanes. It is preferred that the polysiloxanes are completely hydrocarbon-substituted and that the ratio of hydrocarbon groups to silicon atoms is from 1.5 to 3.0.

Methods of preparing said polysiloxanes are described for example in British specifications Nos. 586,189, 586,956, 653,257, 626,909, 585,400, 603,076 and 628,072.

Said long chain alkyl aryl group in said derivative of orthophosphoric acid is preferably a p-alkyl aryl group but may be an ortho-alkyl aryl group or a meta-alkyl aryl group. The alkyl group in said alkyl aryl group is preferably one having at least three carbon atoms and not more than eighteen carbon atoms. Suitable derivatives of ortho-phosphoric acid, i. e. suitable esters of orthophosphoric acid include for example methyl hydrogen p-tert-octolphenyl phosphate, diethyl p-tert-octylphenyl phosphate, dibutyl p-tert-octylphenyl phosphate, diphenyl p-tert-octylphenyl, diethyl p-tert-octylcresyl phosphate, diphenyl p-n-decylphenyl phosphate, diethyl p-n-decylphenyl phosphate and diethyl m-isopropylphenyl phosphate. The esters found to be particularly suitable in the compositions of the invention are diethyl p-tert-octylphenyl phosphate and methyl hydrogen p-tert-octylphenyl phosphate.

The lubricating compositions of the invention may be produced by mixing together any one or more of said esters of phosphoric acid with any one or more of said polysiloxanes. A homogeneous solution or dispersion of any one or more of said esters of phospheric acid in any one or more of said polysiloxanes may be formed depending on the solubility of the said esters of phosphoric acid in polysiloxane. Any desired amount of the esters of phosphoric acid may be added to the polysiloxane but it is preferred to add the esters in an amount not more than about 5% by weight of the polysiloxane in order to preserve the desirable physical and chemical properties of the polysiloxane.

The lubricating compositions of the invention have good lubricating power at elevated temperatures even when the amount of the esters of phosphoric acid present is less than that required to give a saturated solution of the esters in the polysiloxane. Although organo-phosphorus compounds other than those included in the compositions of the invention, as for example tricresyl phosphate, diethyl phenyl phosphate or diethyl-β-naphthyl phosphate, can be mixed with polysiloxanes to give lubricating compositions, such compositions, which are not within the invention, have poor lubricating power at any temperature at which the amount of organo-phosphorus compound present in the composition is less than that required to give a saturated solution.

The term "lubricating power" as used herein denotes the ability of any material to lubricate under "kinetic boundary" conditions and it is considered that the lubricating power of a material is inversely proportional to the coefficient of "kinetic boundary" friction between two specified rubbing surfaces lubricated with that material.

When the compositions of the invention are used to lubricate two rubbing surfaces it is believed that the particular esters of phosphoric acid therein are strongly adsorbed on the metal surfaces and form a number of close packed protective layers which reduce the coefficient of "kinetic boundary" friction and prevent "scuffing."

If desired other ingredients, for example antioxidants, may be included in the lubricating compositions of the invention. Furthermore, metallic soaps, for example sodium or lithium soaps, or fillers, for example finely divided silica, asbestos floats, carbon black or phthalocyanines may also be included to make the lubricating compositions into greases.

The invention is illustrated by Examples 3 to 17 inclusive in the following table. Examples 1, 2 and 18 to 22 inclusive are lubricating compositions outside the invention included for comparison. In the examples all percentages are by weight.

In the following table either polysiloxane A or B is used to make the compositions described in Examples 3–20. A is an "end-stopped" polysiloxane of 300 centistokes viscosity at 38° C. with a methyl to silicon ratio of just over 2:1 and B is an "end-stopped" polymethylphenyl siloxane of 500 centistokes viscosity at 25° C. with a methyl plus phenyl to silicon ratio of just over 2:1 and a methyl to phenyl ratio of approximately 3:1.

The lubricating power of the compositions are found by determining the coefficient of "kinetic boundary" friction between two mild steel test pieces, lubricated with the compositions, on a friction machine of the type described by J. R. Bristow ("Kinetic Boundary Frictions," Proc. Roy. Soc. A 189, 147, 88–102). The load on the lower test piece is 2 kg. and the determinations of the coefficient of "kinetic boundary" friction are made at various temperatures up to 180° C. as recorded in the following table. The friction machine is used damped. The accuracy of the values quoted for the coefficient of friction is approximately ±10% of the true value.

thyl phosphate in polysiloxane A is 1% at 30° C., 44° C. and 65° C. respectively. At 20° C. therefore the 1% compositions of these phosphates contain undissolved phosphate and are therefore non-homogeneous. This undissolved phosphate lies on the surface of the metal test pieces in the friction machine and at 20° C. the coefficient of friction measured is actually that for a lubricant consisting of a saturated solution of the polysiloxane A in the phosphate. It will thus be evident that in Examples 18, 19 and 20 from the high values of the coefficient of friction at the temperatures above 20° C. there can be practically no formation of an adsorbed protective close-packed layer of the phosphate on the rubbing surface. In so far as the compositions of the invention are concerned the compositions for Examples 3 to 9 and 11 to 17 are homogeneous.

What we claim is:

1. A lubricating composition consisting essentially of at least one liquid organopolysiloxane and a minor proportion, not exceeding about 5% by weight of the polysiloxane, of at least one derivative of orthophosphoric acid wherein one hydrogen atom only is replaced by a para-tert.octylphenyl group and wherein at least one of the two

| Example | Polysiloxane | Percent Ester added | Ester added | Coefficient of friction ||||||| 
|---|---|---|---|---|---|---|---|---|---|---|
| | | | | 20 °C. | 60 °C. | 100 °C. | 120 °C. | 140 °C. | 160 °C. | 180 °C. |
| 1 | A | | | 0.62 | 0.77 | 0.77 | 0.73 | 0.80 | 0.78 | 0.76 |
| 2 | B | | | 0.14 | 0.19 | 0.67 | 0.76 | 0.78 | 0.95 | 0.93 |
| 3 | A | 1 | Diethyl p-tert-octyl phenyl phosphate | 0.24 | 0.18 | 0.20 | 0.20 | 0.29 | 0.27 | 0.24 |
| 4 | A | 3 | do | 0.14 | 0.12 | 0.11 | 0.13 | 0.15 | 0.19 | 0.18 |
| 5 | A | 5 | do | 0.14 | 0.13 | 0.13 | 0.15 | 0.17 | 0.18 | 0.19 |
| 6 | B | 3 | do | 0.14 | 0.21 | 0.23 | 0.22 | 0.34 | 0.31 | 0.35 |
| 7 | A | 3 | Diethyl p-tert-octyl cresyl phosphate | 0.27 | 0.50 | 0.58 | 0.74 | 0.62 | 0.78 | 0.75 |
| 8 | A | 3 | Diethyl p-dodecylphenyl phosphate | 0.28 | 0.24 | 0.25 | 0.46 | 0.48 | .55 | 0.52 |
| 9 | B | 3 | Diethyl p-tert-octyl phenyl phosphate | 0.19 | 0.26 | 0.45 | 0.37 | 0.46 | 0.41 | 0.56 |
| 10 | A | 1 | Methyl p-tert-octyl phenyl hydrogen phosphate | 0.15 | 0.14 | 0.17 | 0.18 | 0.17 | 0.15 | 0.14 |
| 11 | B | 0.1 | do | 0.13 | 0.13 | 0.12 | 0.12 | 0.12 | 0.12 | 0.10 |
| 12 | A | 5 | Dibutyl p-tert-octyl phenyl phosphate | 0.21 | 0.42 | 0.50 | 0.80 | 0.71 | 0.77 | 0.74 |
| 13 | B | 1 | Diethyl p-n-decylphenyl phosphate | 0.12 | 0.17 | 0.12 | 0.19 | 0.16 | 0.23 | 0.17 |
| 14 | B | 3 | do | 0.10 | 0.09 | 0.12 | 0.09 | 0.09 | 0.11 | 0.07 |
| 15 | B | 1 | Diphenyl p-n-decylphenyl phosphate | 0.12 | 0.17 | 0.15 | 0.15 | 0.13 | 0.14 | 0.20 |
| 16 | B | 3 | do | 0.12 | 0.12 | 0.11 | 0.11 | 0.09 | 0.13 | 0.12 |
| 17 | B | 3 | Diethyl m-isopropyl phenyl phosphate | 0.15 | 0.16 | 0.30 | 0.32 | 0.38 | 0.40 | 0.33 |

OTHER ORGANO-PHOSPHORUS COMPOUNDS

| Example | Polysiloxane | Percent Ester added | Ester added | 20 °C. | 60 °C. | 100 °C. | 120 °C. | 140 °C. | 160 °C. | 180 °C. |
|---|---|---|---|---|---|---|---|---|---|---|
| 18 | A | 1 | Tricresyl phosphate | 0.21 | 0.47 | 0.75 | 0.84 | 0.87 | 0.87 | 0.84 |
| 19 | A | 1 | Diethyl phenyl phosphate | 0.38 | 0.71 | 0.76 | 0.75 | 0.75 | 0.87 | 0.80 |
| 20 | A | 1 | Diethyl β-naphthyl phosphate | 0.12 | 0.73 | 0.69 | 0.83 | 0.79 | 0.82 | 0.79 |
| 21 | | | Lubricating mineral oil of 80 ctks. viscosity | 0.18 | 0.19 | 0.25 | 0.39 | 0.39 | 0.39 | 0.93 |
| 22 | | | Lubricating mineral oil of 1,200 ctks. viscosity | 0.10 | 0.12 | 0.18 | 0.16 | 0.14 | 0.14 | 0.15 |

Examples 1 and 2 show that the two pure polysiloxanes have poor lubricating power while the compositions of Examples 3, 4, 5, 10, 11, 13, 14, 15 and 16 are seen by comparison with Examples 21 and 22 to have excellent lubricating power and in some instances to have even better lubricating power than a lubricating mineral oil.

Examples 10, 5 and 12 show that as the size of the two non-unsaturated organo groups containing only carbon and hydrogen increases the lubricating power decreases. This effect is believed to be due to two causes. Firstly, increasing the size of said groups increases the solubility of the ester of phosphoric acid in the polysiloxane and as the solubility increases so the surface adsorption decreases. Secondly, increasing the size of said groups tends to prevent surface adsorption of the polar part of the molecule by steric hindrance and also tends to prevent the formation of a close-packed layer.

Examples 18, 19 and 20 show that it is not sufficient to have an orthophosphate in which the groups replacing the hydrogen atoms are small. The solubility of tricresyl phosphate, diethyl phenyl phosphate, and diethyl-β-naphother hydrogen atoms is replaced by a non-unsaturated organo group containing only carbon and hydrogen and having not more than 9 hydrogen atoms.

2. A lubricating composition as claimed in claim 1 wherein the liquid polysiloxane is completely hydrocarbon substituted.

3. A lubricating composition as claimed in claim 1 wherein the derivative of orthophosphoric acid is diethyl para-tertiary-octyl-phenyl phosphate.

4. A lubricating composition as claimed in claim 1 wherein the derivative of orthophosphoric acid is methyl hydrogen para-tertiary-octyl-phenyl phosphate.

5. A lubricating composition as claimed in claim 2 wherein the ratio of hydrocarbon groups to silicon atoms is from 1.5 to 3.0.

References Cited in the file of this patent

UNITED STATES PATENTS 2,340,331    Knutson    Feb. 1, 1944
2,684,336    Moreton    July 20, 1954